United States Patent [19]

Barbe

[11] 4,431,163

[45] Feb. 14, 1984

[54] DEVICE FOR FIXING A COVER ON A BODY AND IN PARTICULAR ON A VALVE BODY

[75] Inventor: Pierre L. C. C. Barbe, Toul, France

[73] Assignee: Pont-A-Mousson S.A., Nancy, France

[21] Appl. No.: 313,716

[22] Filed: Oct. 21, 1981

[30] Foreign Application Priority Data

Oct. 24, 1980 [FR] France .............................. 80 22768

[51] Int. Cl.³ ..................... F16K 3/00; B65D 45/32
[52] U.S. Cl. .............................. 251/367; 137/315; 220/319; 285/305
[58] Field of Search ................. 220/319, 328, 315; 285/305; 251/367; 137/315

[56] References Cited

U.S. PATENT DOCUMENTS

| | | | |
|---|---|---|---|
| 268,686 | 12/1882 | Kaiser | 285/305 |
| 3,389,887 | 6/1968 | Antunez, Jr. | 251/367 |
| 4,251,054 | 2/1981 | Baas | 220/319 |
| 4,293,148 | 10/1981 | Milberger | 285/305 |

FOREIGN PATENT DOCUMENTS 1009812  6/1952  France .............................. 285/305

Primary Examiner—A. Michael Chambers
Attorney, Agent, or Firm—Sughrue, Mion, Zinn, Macpeak and Seas

[57] ABSTRACT

The cover is fixed without the use of bolts. On each side thereof, an almost closed groove is defined in one half by the peripheral portion of the cover and in the other half by the peripheral portion of the body. This groove extends only in a part of the major length of the valve and receives two round locking bars which are inserted in the groove by way of a center cavity. An outer sealing element hermetically closes the gap between the cover and the body and the two cavities. Application of the device in buried valves exposed to corrosive atmospheres.

12 Claims, 7 Drawing Figures

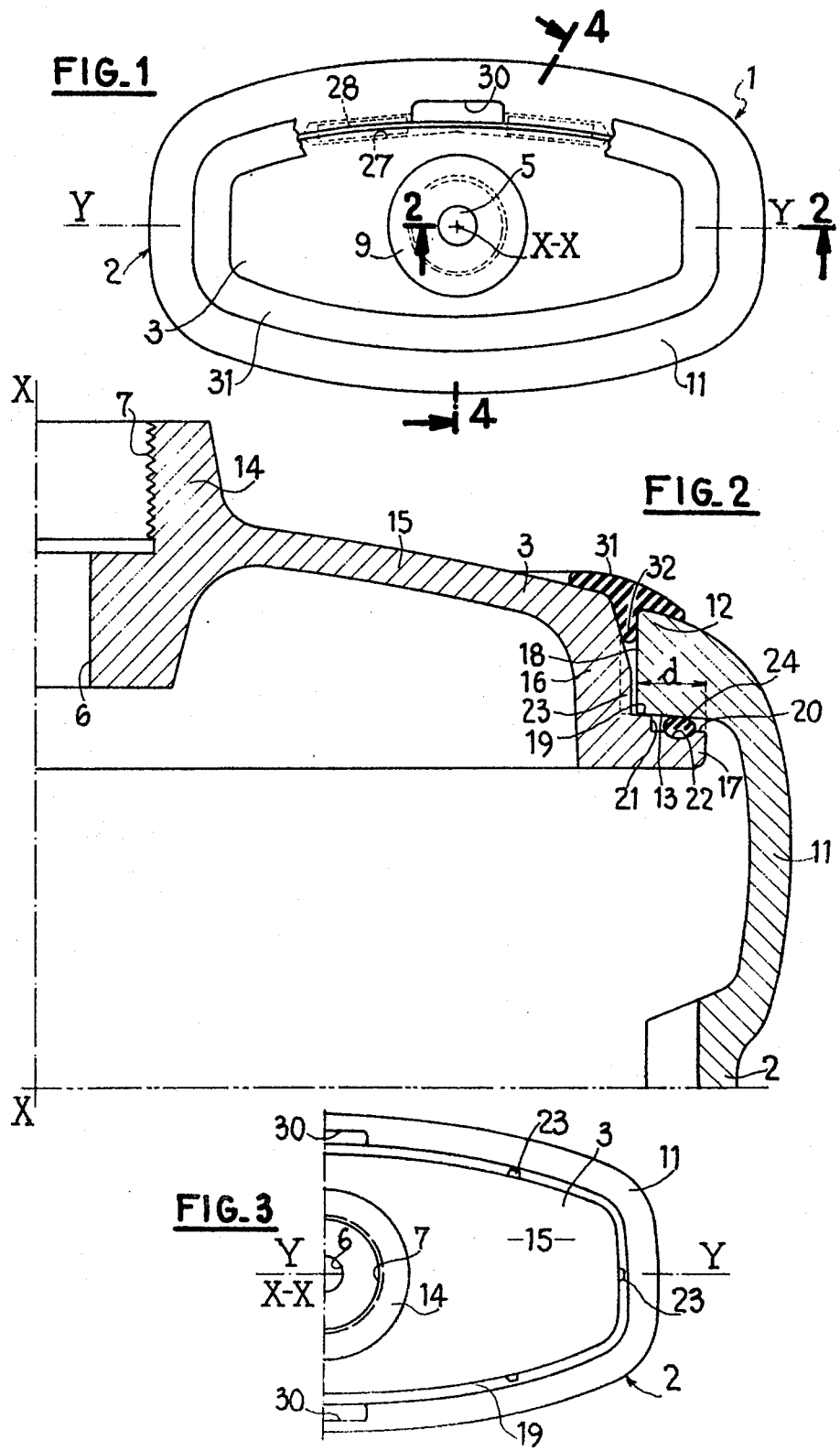

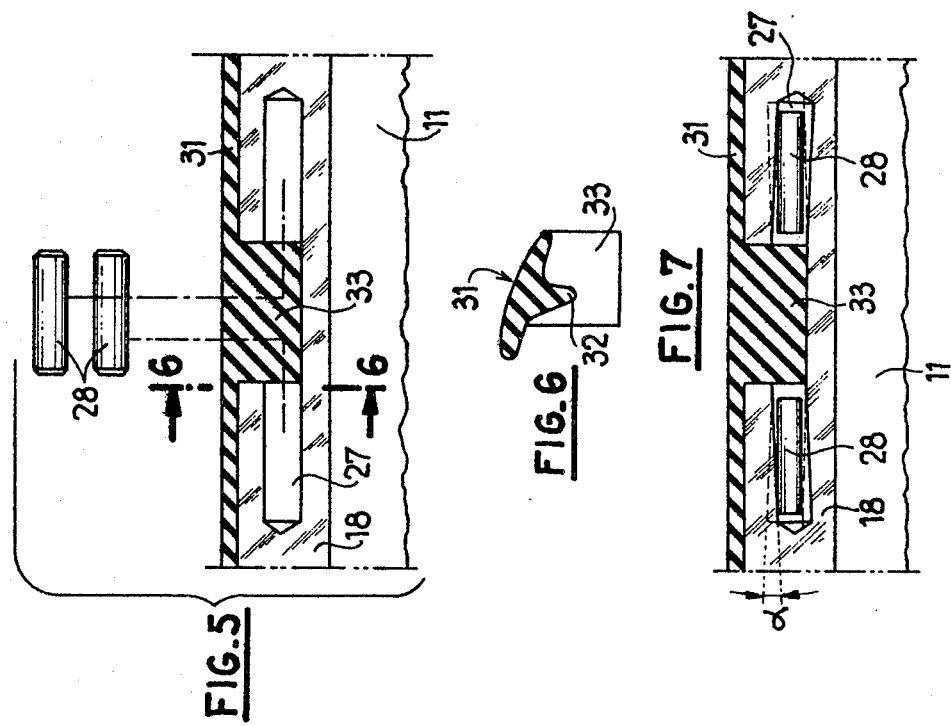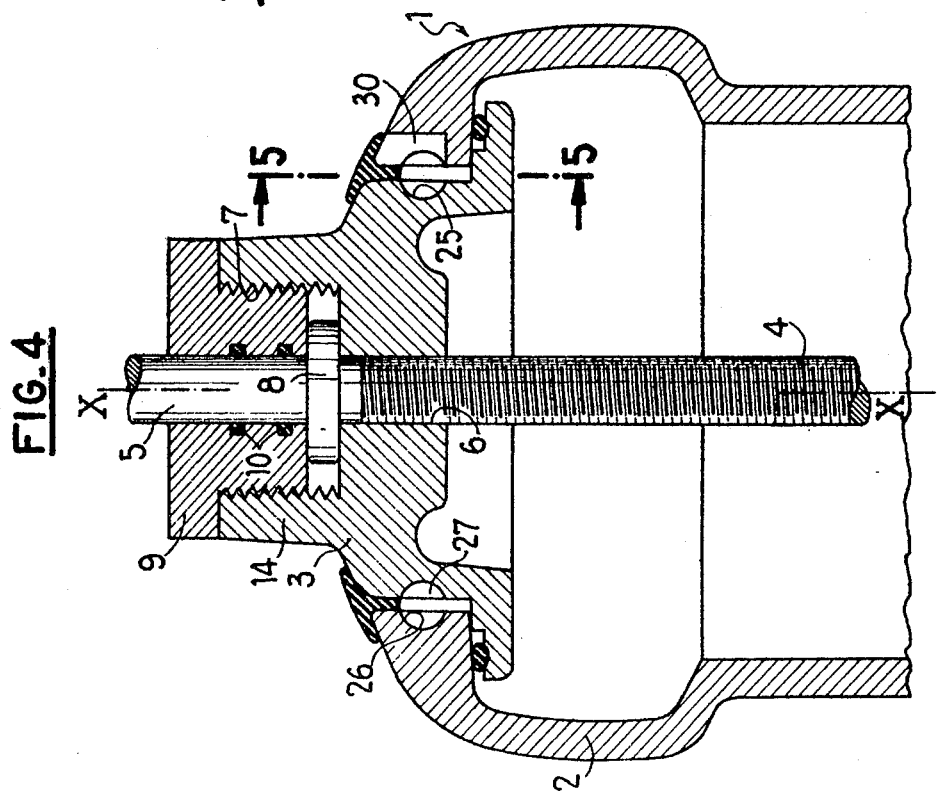

DEVICE FOR FIXING A COVER ON A BODY AND IN PARTICULAR ON A VALVE BODY

DESCRIPTION

The present invention relates to a device for fixing a cover on a body, and in particular a cover having a generally elliptical shape, on a valve body having an enlargement at its entrance, of the type comprising an annular sealing element and relatively rigid circumferential locking means retained in a groove formed by two semi-grooves which are in confronting relation and are respectively formed in the peripheral portion of the body and in the peripheral portion of the cover, a cavity permitting the insertion of the locking means being provided in at least one of the two peripheral portions.

Devices of the aforementioned type permit the avoidance of any bolting and consequently any sharp edge which always create regions particularly liable to corrode.

In a known device of this type (patent DE No. 946 580), the groove extends throughout the perimeter of the assembly and there is employed as the locking means a coil spring which is progressively inserted through the inserting cavity until it is closed onto itself.

This arrangement may be suitable for fixing circular covers, as is the case in the cited document, but would be extremely difficult to employ in the case of a cover having an enlongated elliptical general shape which is often employed in valves having a sliding closure member.

An object of the invention is therefore to provide a fixing device which is better adapted for such an application and which is also much cheaper.

Accordingly, the invention provides a fixing device of the aforementioned type, wherein the groove extends only in a part of the perimeter of the cover and body.

Preferably, the device comprises circumferential retaining means for the locking element disposed in said cavity.

If the device comprises in addition, according to another advantageous feature of the invention, a sealing element for closing the peripheral gap between the cover and the body, the locking means may be made from a material which is cheaper than stainless steel. There may moreover be provided on this sealing element a thickened portion which closes said cavity in a sealed manner and which also constitutes means for retaining the locking means.

A positive locking is ensured in both directions if, in accordance with a particular embodiment of the invention, the semi-grooves have a slight relative angular deviation in a direction perpendicular to the circumferential direction.

The invention will be described hereinafter in more detail with reference to the accompanying drawings which show solely one embodiment and in which:

FIG. 1 is a plan view, with a part cut away, of a valve provided with a fixing device according to the invention;

FIG. 2 is a half view to an enlarged scale in section on the line 2—2 of FIG. 1;

FIG. 3 is a half view in plan corresponding to FIG. 1 of the valve body and cover alone;

FIG. 4 is a sectional view taken on line 4—4 of FIG. 1;

FIG. 5 is a sectional view taken on line 5—5 of FIG. 4; illustrating the locking of the cover;

FIG. 6 is a sectional view taken on line 6—6 of FIG. 5 of the outer sealing element;

FIG. 7 is a view similar to FIG. 6 of a modification of the invention.

With reference to FIGS. 1 to 6, the invention is shown applied to the sealed closure of a buried valve 1 comprising a valve body 2, an upper cover or cap 3 and a screwthreaded operating rod 4 which extends through the cover and, upon its rotation, displaces in translation in the body 2 a closure member or slide (not shown). For this purpose, the lower end portion (not shown) of the rod 4 is screwthreadedly engaged in a tapped aperture of the closure member or in a nut rigid with the latter. As can be seen in FIGS. 2 and 4, the upper end portion 5 of the rod 4 is smooth and upwardly extends through a centre aperture 6 of the cover 3 which guides this rod, then a larger tapped counterbore 7. A flange 8 provided on the end portion 5 is maintained axially against the shoulder defined by the counterbore 7, while being freely rotatable, by the lower surface of a plug 9 which is screwthreadedly engaged in the counterbore 7. A seal is provided between the plug and the rod 4 by two 0-rings 10.

Above the plug 9, the rod 4 is connected to some suitable manual or motorized operating device (not shown).

The valve body 2 has a generally elongated elliptical shape in plan. Its upper end has an enlarged portion 11 which terminates in an inwardly extending flange 12 whose inner or lower surface 13 is substantially planar and horizontal.

The cover 3 also has a generally elliptical shape in plan homothetic to that of the enlarged portion 11. This cover has a centre hub 14 through which the bore 6 and counterbore 7 extend, an intermediate slightly downwardly sloping portion 15 connecting the hub to a substantially vertical downwardly extending peripheral skirt portion 16, and a horizontal ledge 17 which outwardly projects from the periphery of the lower end of the skirt portion.

The distance between the free edge of this ledge 17 and the axis X—X of the operating rod 4 is, at every point of the periphery, greater by a constant amount d (FIG. 2) than the distance between this axis and the radially inner and vertical surface 18 of the flange 12 of the valve body. The upper side of the ledge 17 has a step. It comprises a small inner roughly horizontal region 19 and a large outer region 20 which is also roughly horizontal and is located at a slightly lower level and connected to the region 19 by a vertical shoulder 21. A recess 22 having a cross-section in the shape of an arc of a circle is provided in the region 20.

The skirt portion 16, which is inserted with a relatively large clearance in the opening defined by the flange 12, has a number of outer projections 23 for centering it relative to the radially inner surface 18 of this flange.

When the valve is in the use, the inner region 19 of the ledge 17 bears against the lower surface 13 of the flange 12 and an elliptical rubber sealing element 24 having a roughly circular cross-sectional shape is positioned by the recess 22 and is vertically compressed between the bottom of the recess and the surface 13 of the flange 12.

The cover 3 is fixed to the body 2 in the following manner.

Formed in the outer surface of the skirt portion 16 is a semi-groove 25 which has a roughly semi-circular cross-sectional shape and symmetrically extends in a part of each large side of the ellipse, for example in about one half of its large dimension. Formed in the surface 18 of the flange 12 at the same level and with the same extent, is a semi-groove 26 which has a roughly semi-circular cross-sectional shape. When the cover is in position, the semi-grooves 25 and 26 are in confronting relation to each other and together define, on each side of the major axis Y—Y of the ellipse, a circular groove 27 which is horizontal and blind and almost closed which receives two locking elements 28. Each element 28 is formed by a section of a round bar 29 of ordinary metal whose diameter is slightly less than the diameter of the groove 27. The elements 28 have been omitted in FIG. 4 in order to render the drawing more clear.

In order to permit the insertion of the elements 28, a parallelepipedic cavity 30 is formed in the surface 18 of the flange 12 in the middle of the length of each groove 27 and is upwardly open. The length of the cavity 30 is of the order of one third of the length of the groove 27 and is roughly equal to the length of each element 28.

The assembly is completed by an outer rubber sealing element 31 which has a T-shaped cross-section. The vertical portion 32 of this T closes the radial gap between the upper end of the skirt portion 16 and the upper end of the flange 12, these two ends being rounded and covered respectively by the two upper branches of the T. The sealing element 31 has been partly broken away in FIG. 1.

In two places corresponding to the two cavities 30 and having the same extent, the sealing element 31 includes a parallelepipedic thickened portion 33 (not shown in FIG. 4) adapted to sealingly close these cavities.

The assembly of the valve will now be described.

The closure member of the valve is placed in position in its guiding surfaces (not shown) provided in the valve body. The cover 3, equipped with the sealing element 24, turned about the axis X—X and inclined about its major axis Y—Y, is inserted slantwise in the enlarged portion 11 of the valve body and then put back into a horizontal position. It then bears against the lower ledge of the enlarged portion 11. The screwthreaded operating rod 4 is passed through the bores 6 and 7 of the cover and fully screwed into the tapped aperture of the closure member or in a nut rigid with the latter.

The plug 9 with its sealing elements 10 is then screwed into the counterbore 7 of the cover 3 the flange 8 of the operating rod 4 bears against the shoulder of the counterbore 7 of the cover by its lower side and against the plug 9 by its upper side, so as to render the cover unitary in translation with the operating rod 4. The latter is then rotated in a direction for unscrewing and this imparts thereto an upward movement in translation, the cover moving with the rod. The cover 3 thus comes into contact by the region 19 of its ledge 17 with the support surface 13 of the valve body, the sealing element 24 being compressed to an extent limited by the abutment of the surfaces 19 and 13 one against the other.

Two locking elements 28 are then inserted on each side of the major axis Y—Y. These elements 28 are inserted in the corresponding cavity 30 and then urged into the groove 27 on each side of this cavity as illustrated in FIG. 5. Then the outer sealing element 31 is placed in position by inserting each thickened portion 33 thereof in a cavity 30. Thus each thickened portion 33 retains two elements 28 in the corresponding groove 27 while protecting them in a sealed manner against entry of possibly corrosive exterior fluids into this groove.

It will be clear that the cover 3 can no longer move upwardly or downwardly relative to the body 2. This result is obtained very cheaply: the two parts 2 and 3 are as-cast, the sole machining required concerning the fluid-tight guiding of the rod 4 in the cover 3 (and possibly the flanges for connecting the body 2 to pipes), and not the device for fixing the cover to the body 2; the locking is achieved by short lengths of round bar 28 of a cheap metal (for example steel) which is not necessarily stainless.

Note that in the case of an increased pressure within the body 2, the inner sealing element 24 is urged in the direction of the axis X—X. Consequently, it has a tendency to increase its compression and its displacement is limited in a definite manner by the shoulder 21. Further, the absence of any sharp outer edge on the body and on the cover facilitates the effective coating of the valve with an anticorrosion protective layer.

The modification shown in FIG. 7 differs from the foregoing embodiment by the fact that the semi-grooves 25, instead of being exactly in confronting relation to each other, are slighty angularly deviated in a vertical plane and form, relative to each other, an angle $\alpha$ of the order of 2° to 5°, the axes of the semi-grooves intersecting in the middle of their length, i.e. in the centre of the cavity 30. When locking the cover, the locking elements 28 are forced into the two cavities thus formed so that any vertical play between the cover and the valve body is eliminated.

Note that the dimensions of the enlarged portion 11 of the body 2 and the eccentricity of the ellipse of the valve, viewed in plan, must be such as to permit the insertion of the ledge 17 of the cover 3 under the flange 12 of the body 2. In the illustrated embodiment, the ratio minor axis/major axis is between 2 and 3 for the cover 3 and a little less than 2 for the enlarged portion 11 of the body 2.

In the foregoing description, it has been assumed that the axis X—X of the operating rod 4 is vertical. However, it will be understood that this axis may have any suitable orientation when the valve is in use.

By way of a modification, the outer sealing element 31 may be replaced by another type of sealing element, for example an elastically yieldable ring (not shown) which has a relatively great height and is fitted onto the valve from above and is applied elastically against the outer surface of the enlarged portion 11 and on the outer region of the portion 15 of the cover.

Having now described my invention what I claim as new and desire to secure by Letters Patent is:

1. In a structure comprising a hollow body having a substantially vertical axis, a cover, an annular sealing element interposed between the cover and the body, and means for maintaining the cover in position in the body in a direction parallel to said axis; the improvement wherein said maintaining means comprise a first groove in a peripheral portion of the cover, a second groove in a peripheral portion of the body in confronting relation to the first groove, rigid elongate locking means engaged in said grooves and having a length and a width, which width is less than said length, a cavity in at least one of said peripheral portions, which cavity extends upwardly from the groove in said at least one peripheral portion and has a length longtiudinally of said grooves which is substantially equal to the length of the locking means to allow selectively insertion and extraction of the locking means transversely of the length of the locking means, the cavity being so disposed relative to the grooves as to allow insertion of the locking means in the confronting grooves longitudinally of the locking means to a cover maintaining position, the locking means having a length which is a minor fraction of the perimeter of the hollow body, and the sealing element being in a compressed condition axially of the body when the locking means are in said cover maintaining position.

2. A structure according to claim 1, wherein the cover has a generally elliptical shape and the body is a valve body having an enlarged portion defining an entrance of the valve body.

3. A structure according to claim 1 or 2, comprising a second sealing element for closing a peripheral gap between the cover and the body.

4. A structure according to claim 1 or 2, comprising means disposed in said cavity for circumferentially retaining the locking means in the confronting grooves.

5. A structure according to claim 3, comprising a thickened portion of the gap-closing sealing element which closes said cavity in a sealed manner and circumfemrentially retains the locking means.

6. A structure according to claim 1 or 2, wherein the locking means comprise a small number of rectilinear elongate sections of a bar.

7. A structure according to claim 1 or 2, wherein the groove comprises two separate groove portions located on each side of a plane containing the axis of the body, each of said groove portions being provided with a respective said cavity for inserting the locking means.

8. A structure according to claim 7, wherein each cavity is located in the middle of the length of the associated groove portion.

9. A structure according to claim 1 or 2, wherein the semi-grooves have a slight relative angular deviation in a direction perpendicular to the circumference of the cover and body.

10. A structure according to claim 1 or 2, wherein the locking means have a cross-sectional size less than the cross-sectional size of the confronting grooves.

11. A structure according to claim 1 or 2, wherein the body has an inner flange and the peripheral portion of the cover includes a ledge which is inserted under the inner flange and the sealing element is compressed between the ledge and the flange axially of the body.

12. A structure according to claim 11, wherein the ledge has an inner step which bears against a free edge portion of the flange of the body, and a circumferentially extending recess for positioning the sealing element.

* * * * *